Figure 1:
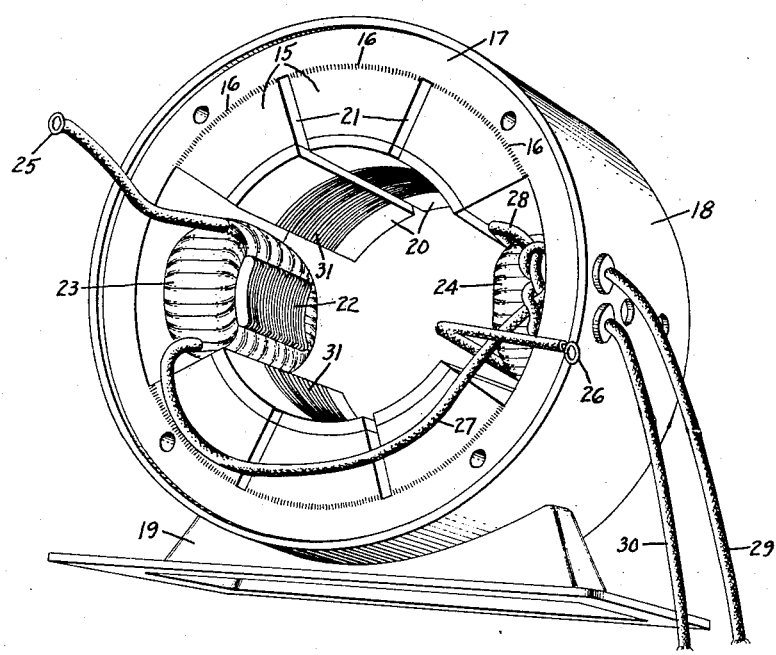

March 12, 1940.  W. R. GOSS ET AL  2,193,406
DYNAMO-ELECTRIC MACHINE
Filed Aug. 28, 1937   2 Sheets-Sheet 1

Inventors:
Wesley R. Goss,
Frank W. Merrill,
by Harry E. Dunham
Their Attorney.

March 12, 1940.  W. R. GOSS ET AL  2,193,406
DYNAMO-ELECTRIC MACHINE
Filed Aug. 28, 1937  2 Sheets-Sheet 2
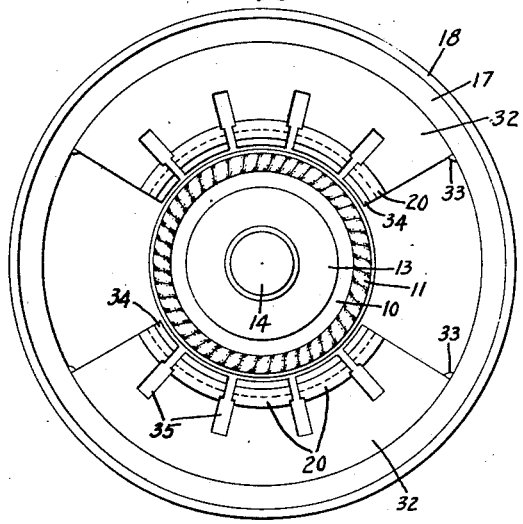
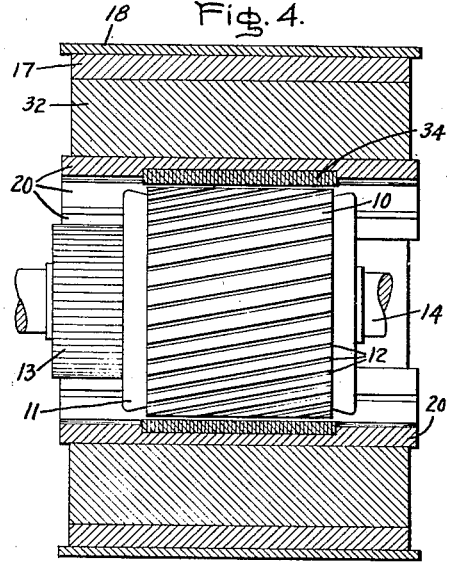
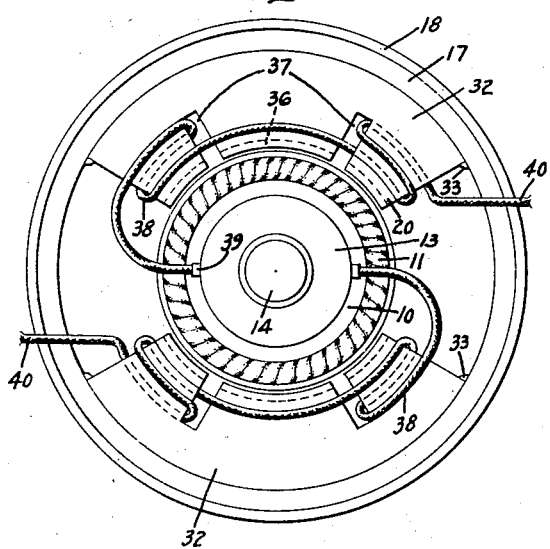
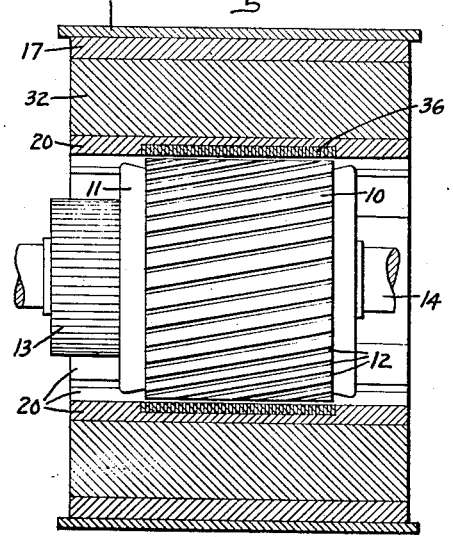
Inventors:
Wesley R. Goss,
Frank W. Merrill,
by Harry E. Dunham
Their Attorney.

Patented Mar. 12, 1940

2,193,406

UNITED STATES PATENT OFFICE 2,193,406

DYNAMO-ELECTRIC MACHINE

Wesley R. Goss and Frank W. Merrill, Fort Wayne, Ind., assignors to General Electric Company, a corporation of New York Application August 28, 1937, Serial No. 161,452

16 Claims. (Cl. 171—209)

Our invention relates to improvements in dynamo-electric machines, and particularly the type of machine having a permanent magnet excitation system.

Permanent magnets have heretofore been used for the excitation of small dynamo-electric machines, but the size of these machines generally has been relatively large compared to electrically excited machines of the same rating. Such magnets usually have been of the horseshoe shape to obtain the length and shielding against demagnetization necessary for satisfactory performance. Recent improvements in permanent magnet materials provide high magnetic retentivity. Such magnets may be formed of an iron-nickel-aluminum alloy as described in United States Patent 1,947,274, February 13, 1934, Ruder, or an iron-nickel-aluminum-cobalt alloy as described in United States Patent 1,968,569, July 13, 1934, Ruder, as these and similar materials retain their magnetism indefinitely. In order to utilize such magnets to best advantage, we have found it desirable to use permanent magnet pole pieces of greater axial length than the magnetic core of the other member of the dynamo-electric machine, and to provide each pole piece with a pole face of soft magnetic material for concentrating the flux into the air gap between the magnetic core and the pole piece. Such an arrangement is disclosed and claimed in Merrill Patent 2,059,886 granted November 3, 1936, to the General Electric Company, assignee of this invention. With this or similar arrangement, we have found that the cross magnetomotive force of an electric current in the winding on the magnetic core member with which the permanent magnet pole pieces cooperate electrodynamically tends to produce a cross-magnetic flux which passes through the pole faces and the ends of the pole pieces adjacent the core, and thereby increases the saturation thereof and decreases the effectiveness of the flux concentrator pole faces and of the permanent magnet pole pieces. Furthermore, the varying magnetic reluctance between the pole faces and the core which is produced by the rotation of the teeth and slots of the core induces eddy currents in the pole faces, which results in increased losses and poor voltage regulation at higher speeds.

An object of our invention is to provide a dynamo-electric machine with a permanent magnet excitation system of improved construction for providing improved operating characteristics of the machine.

Further objects and advantages of our invention will become apparent and our invention will be better understood from the following description referring to the accompanying drawings, and the features of novelty which characterize our invention will be pointed out with particularity in the claims annexed to and forming part of this specification.

Figure 2:
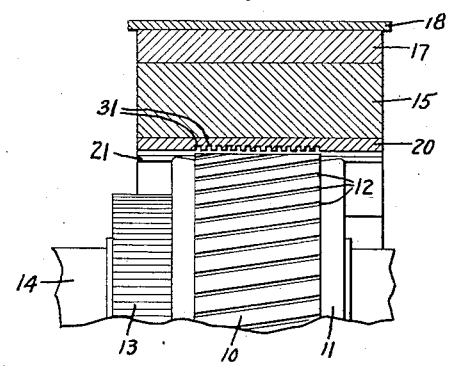

In the drawings, Fig. 1 is a perspective view of a dynamo-electric machine provided with an embodiment of our improved excitation system with the rotatable member removed to better illustrate the construction of the permanent magnet pole pieces; Fig. 2 is a partial sectional side elevation of the machine illustrated in Fig. 1; Fig. 3 is an end view of a dynamo-electric machine having a stationary member provided with another embodiment of our improved excitation system; Fig. 4 is a side elevation partly in section of the machine illustrated in Fig. 3; Fig. 5 is an end view of a dynamo-electric machine having a stationary member provided with a further embodiment of our improved excitation system; and Fig. 6 is a side elevation partly in section of the machine illustrated in Fig. 5.

Referring to the drawings, in Figs. 1 and 2, we have illustrated a dynamo-electric machine including a rotatable member provided with a laminated core 10 having a winding 11 arranged in slots 12 in the core 10 and connected to a commutator 13. This rotatable member is essentially a conventional direct-current armature, and is mounted on a shaft 14. The excitation system of the dynamo-electric machine comprises a stationary member arranged to cooperate electrodynamically with the rotatable member, and includes a pair of transversely arcuate circumferentially extending thin bar-type permanent magnet pole pieces each including three permanent magnet elements or pads 15, which are welded at 16 to a magnetic soft iron or soft steel supporting member or frame 17. The frame 17 is mounted in another frame or cylindrical shell 18 which is provided with a base 19 for supporting the dynamo-electric machine. These pole pieces 15 are preferably formed of an alloy of aluminum, nickel, cobalt, and iron of Ruder Patent 1,968,569, such as that mentioned above, and in a machine provided with this type of permanent magnet pole piece, we have found it desirable to construct the pole pieces 15 of substantially greater axial length than the length of the rotatable magnetic core 10. In order to obtain the desired flux density in the air gap, we provide magnetic soft iron or soft steel pole faces 20 which act as flux concentrators and are carried on the inner ends of the pole pieces 15. These pole faces have substantially the same axial length and pole face surface area as the pole pieces 17, and provide a path of low magnetic reluctance for concentrating or collecting the flux produced by the portion of the pole pieces extending beyond the air gap between the pole pieces and the magnetic core 10 and minimize flux leakage at the ends of the pole pieces. This feature of this construction is disclosed in the above mentioned Merrill Patent 2,059,886.

Under certain operating conditions, we have found that a cross magnetomotive force is set up by the electric current induced in the winding 11 of the rotatable member, and that this cross magnetomotive force acts substantially in quadrature with the magnetomotive force of the permanent magnet pole pieces 15 and produces a cross flux extending circumferentially through the pole faces 20 and the pole pieces 15, which tends to saturate the pole faces and the adjacent portion of the pole pieces, thereby decreasing the effectiveness thereof. Furthermore, if the permanent magnet excitation system is used to excite a single phase winding, a double frequency flux is set up by the current in the winding 11 which has a strong demagnetizing effect upon the permanent magnet pole pieces 15. In order to overcome or minimize the effect of the cross magnetomotive force on the permanent magnet pole pieces, we have found it desirable to increase the magnetic reluctance of the excitation system to cross magnetizing flux by providing axially extending slots or gaps 21 which extend radially through the pole faces 20 and the pole pieces 15. In this manner, additional air gaps are provided in the magnetic circuit of the cross magnetizing flux, and thereby tend to effectively reduce cross magnetizing flux in the pole pieces. In order to further minimize the effect of the cross magnetomotive force, we have found it desirable in some instances to provide pole pieces having relatively wide pole faces 22 which are excited by field exciting windings 23 and 24 in such a manner as to set up a magnetomotive force in opposition to the cross magnetomotive force produced by electric current through the rotatable winding 11. In order to effectively oppose variations in the flux density in the permanent magnet pole pieces which might be produced by cross magnetizing flux, the two field exciting windings 23 and 24 are connected by the electric conductors 25 and 26 respectively, to brushes across the rotatable member winding 11 through the commutator 13. The other terminals of each of these field exciting windings 23 and 24 are connected by the electrical conductors 27 and 28 to the outside terminals 29 and 30, respectively, of the machine. In this manner, the field exciting windings 23 and 24 are each energized in accordance with the electric current through the rotatable member winding 11, and set up a magnetomotive force which is almost substantially equal and opposite to the cross magnetomotive force set up by the electric current in the rotatable member winding 11.

Furthermore, we have found that the rotation of the rotatable member produces a varying magnetic reluctance and a varying flux between the rotatable member 10 and the pole faces 20 as the teeth and slots 12 rotate past the pole pieces 20, and induce eddy currents in the pole faces, resulting in increased losses and poor voltage regulation at high speeds. In order to minimize eddy currents in the pole faces adjacent the magnet core 10 and winding 11, we form a plurality of circumferentially extending shallow grooves 31 on the outer face of each of the pole faces over that portion of the pole face adjacent the magnetic core 10 of the rotatable member. These grooves increase the electrical resistance of the pole face 20 and effectively minimize eddy currents therein.

In Figs. 3 and 4, we have shown a dynamo-electric machine provided with another embodiment of our invention and having a rotatable member of the same general construction as that illustrated in Figs. 1 and 2. The dynamo-electric machine includes a stationary member arranged to cooperate electrodynamically with the rotatable member and is provided with a pair of transversely arcuate circumferentially extending thin bar-type permanent magnet pads or pole pieces 32, which are preferably formed of an alloy of aluminum, nickel, cobalt, and iron such as that mentioned above. These pole pieces 32 are secured by welding at 33 to a supporting frame 17 of soft magnetic material arranged within a shell or frame 18, and each of the pole pieces is provided with a pole face 20 of soft magnetic material for concentrating or collecting the flux from the portion of the pole pieces extending beyond the rotatable core 10 and the air gap between the magnetic core 10 and the pole pieces. In order to minimize eddy currents which may be induced in the pole faces 20 by the rotation of the slotted core 10, we arrange a plurality of circumferentially extending laminated inserts 34 on the portion of the outer face of each of the pole faces adjacent the magnetic core 10. These laminations 34 project slightly beyond the outer face of the pole faces 20 and thereby further tend to concentrate the flux into the air gap between the core 10 of the rotatable member and these laminations, thereby minimizing flux leakage around the ends of the pole faces. As in the arrangement shown in Figs. 1 and 2, a plurality of axially extending slots or gaps 35 extend through the pole faces 20, the laminations 34, and into the permanent magnet pole pieces 32, and increase the magnetic reluctance of the pole pieces in a circumferential direction, thereby increasing the reluctance of the pole pieces to cross magnetizing flux and minimizing the effect of the cross magnetomotive force set up by the electric current in the rotatable member winding 11. In order to further minimize the effect of the cross magnetizing flux upon the saturation of the pole faces, the slots 35 through the pole faces 20 and the laminations 34 are made narrower than the portion of the slots which extend into the pole pieces 32. In this manner, the cross-section of the pole faces 20 and the laminations 34 is increased over the cross-section of the permanent magnet pole pieces 35 adjacent the pole faces, and the pole faces, therefore, are not as readily saturated as the adjacent portion of the permanent magnet pole pieces, and are, therefore less susceptible to magnetic variations due to the cross magnetizing flux.

In Figs. 5 and 6, we have shown a dynamo-electric machine provided with a further embodiment of our invention, and having a rotatable member of substantially the same construction as that shown in Figs. 1, 2, 3, and 4. The dynamo-electric machine includes a stationary member arranged to cooperate electrodynamically with the rotatable member, and is provided with a pair of transversely arcuate circumferentially extending bar-type permanent magnet pads or pole pieces 32 preferably formed of an alloy of aluminum, nickel, cobalt, and iron, such as that mentioned above. These pole pieces 32 are secured by welding at 33 to a supporting frame 17 of soft magnetic material arranged within a shell 18. Each of the pole pieces is provided with a pole face 20 of soft magnetic material for concentrating or collecting the flux of the permanent magnet pole pieces 32 into the air gap between the magnetic core 10 and the pole pieces. In order to minimize eddy currents which may be induced in the pole faces 20 by the rotation of the rotatable member magnetic core 10, a plurality of laminated inserts 36 are arranged on the portion of the outer face of each of the pole faces adjacent the magnetic core 10, in a manner similar to that shown in Figs. 3 and 4. In order to simplify the construction, the laminations 36 extend inwardly the same amount as the pole faces 20. As in Figs. 1, 2, 3, and 4, a plurality of axially extending grooves 37 extend radially through the pole faces 20 and the laminations 36 into the permanent magnet pole pieces 32, in order to increase the reluctance of the pole pieces to cross magnetizing flux and minimize the effect of the cross magnetomotive force produced by electric current in the rotatable member winding 11. In order further to minimize the effect of this cross magnetomotive force upon the permanent magnet pole pieces, a winding 38 is arranged about each end of each pole piece in the slots 37 and around the adjacent side of the pole pieces in such a manner as to provide a component of magnetomotive force in the same direction as a corresponding component of magnetomotive force produced by the next adjacent field exciting winding on the next adjacent end of the next adjacent pole piece. One terminal of each of these field exciting windings 38 is connected in series with one of the brushes 39 on the commutator 13 and, therefore, in series with the rotatable member winding 11, and the other terminal of each of these windings is connected to the external terminals 40 of the machine. These field exciting windings 38 are arranged to produce a magnetomotive force in opposition to the cross magnetomotive force produced by the electric current in the rotatable member winding 11 and are energized in accordance with the electric current in this rotatable member winding. In this manner, the effect of the cross magnetomotive force produced by the current in the rotatable member winding 11 on the permanent magnet pole pieces is effectively minimized.

While we have illustrated and described particular embodiments of our invention, modifications thereof will occur to those skilled in the art. We desire it to be understood, therefore, that our invention is not to be limited to the particular arrangements disclosed, and we intend in the appended claims to cover all modifications which do not depart from the spirit and scope of our invention.

What we claim as new and desire to secure by Letters Patent of the United States, is:

1. A dynamo-electric machine having a core of magnetic material provided with a winding, a magnetic excitation system arranged to cooperate electrodynamically with said core and winding, said magnetic excitation system including permanent magnet pole pieces, a member of soft magnetic material arranged to support said pole pieces, pole faces of soft magnetic material carried by said pole pieces, means on the outer face of each of said pole faces adjacent said core and winding for minimizing eddy currents in said pole faces, and means for minimizing variations in flux density in said pole pieces from cross magnetizing flux produced by electric current in said winding.

2. A dynamo-electric machine having a core of magnetic material provided with a winding, a magnetic excitation system arranged to cooperate electrodynamically with said core and winding, said magnetic excitation system including permanent magnet pole pieces, a member of soft magnetic material arranged to support said pole pieces, pole faces of soft magnetic material carried by said pole pieces, means on the outer face of each of said pole faces adjacent said core and winding for minimizing eddy currents in said pole faces, and means for increasing the magnetic reluctance of said pole pieces to cross magnetizing flux produced by electric current in said winding.

3. A dynamo-electric machine having a core of magnetic material provided with a winding, a magnetic excitation system arranged to cooperate electrodynamically with said core and winding, said magnetic excitation system including permanent magnet pole pieces, a member of soft magnetic material arranged to support said pole pieces, pole faces of soft magnetic material carried by said pole pieces, means on the outer face of each of said pole faces adjacent said core and winding for minimizing eddy currents in said pole faces, means including a field exciting winding energized in accordance with electric current through said first-mentioned winding for producing a component of magnetomotive force in opposition to a cross component of magnetomotive force from an electric current through said first-mentioned winding, and means for increasing the magnetic reluctance of said pole pieces to cross magnetizing flux produced by electric current in said first-mentioned winding.

4. A dynamo-electric machine having a core of magnetic material provided with a winding, a magnetic excitation system including a plurality of permanent magnet pole pieces arranged to cooperate electrodynamically with said core, a member of soft magnetic material arranged to support said pole pieces, a pole face of soft magnetic material carried by each of said pole pieces, and means including a plurality of laminations projecting radially beyond said pole faces toward said core and supported by each of said pole faces adjacent said magnetic core and winding for minimizing eddy-currents in said pole faces and for concentrating the flux of said pole pieces into the portion of the air gap between said pole faces and said core.

5. A dynamo-electric machine having a core of magnetic material provided with a winding, a magnetic excitation system arranged to cooperate electrodynamically with said core including circumferentially extending thin permanent magnet pole pieces of substantially greater axial length than said core, pole faces of soft magnetic material carried by said pole pieces and having substantially the same axial length as said pole pieces, and means including a plurality of circumferentially extending grooves formed in the portion of the outer face of each of said pole faces adjacent said magnetic core and winding for minimizing eddy-currents in said pole faces, and means for minimizing variations in flux density in said pole faces from cross-magnetizing flux produced by electric current in said winding.

6. An excitation system for a dynamo-electric machine including a core of magnetic material, circumferentially extending thin permanent magnet pole pieces secured to said core, pole faces of soft magnetic material carried by said pole pieces, said pole faces having substantially the same axial length as said pole pieces and having substantially the same pole face surface area as said pole pieces, and means projecting radially beyond said pole faces toward said core for minimizing eddy-currents in a portion of each of said pole faces, and means for increasing the magnetic reluctance of said pole pieces to cross-magnetizing flux.

7. An excitation system for a dynamo-electric machine including a core of magnetic material, circumferentially extending thin permanent magnet pole pieces secured to said core, pole faces of soft magnetic material carried by said pole pieces, said pole faces having substantially the same axial length as said pole pieces and having substantially the same pole face surface area as said pole pieces, and means including an assembly of circumferentially extending laminations of magnetic material arranged over a portion of each of said pole faces for minimizing eddy-currents in said pole faces, and means for minimizing variations in flux density in said pole pieces from cross-magnetizing flux.

8. An excitation system for a dynamo-electric machine including a core of magnetic material, circumferentially extending thin permanent magnet pole pieces secured to said core, pole faces of soft magnetic material carried by said pole pieces, said pole faces having substantially the same axial length as said pole pieces and substantially the same pole face surface area as said pole pieces, and means including a plurality of circumferentially extending shallow grooves formed in a portion of the outer face of each of said pole faces for minimizing eddy-currents in said pole faces, and means for increasing the magnetic reluctance of said pole pieces to cross-magnetizing flux density.

9. A dynamo-electric machine having a core of magnetic material provided with a winding, a magnetic excitation system including a plurality of permanent magnet pole pieces arranged to cooperate electrodynamically with said core, a member of soft magnetic material arranged to support said pole pieces, a pole face of soft magnetic material carried by each of said pole pieces, and means for minimizing the effect on said pole pieces of cross magnetizing flux set up by electric current in said winding.

10. A dynamo-electric machine having a core of magnetic material provided with a winding, a magnetic excitation system including a plurality of permanent magnet pole pieces arranged to cooperate electrodynamically with said core, a member of soft magnetic material arranged to support said pole pieces, a pole face of soft magnetic material carried by each of said pole pieces, and means for increasing the magnetic reluctance of said pole pieces to cross magnetizing flux set up by electric current in said winding.

11. A dynamo-electric machine having a core of magnetic material provided with a winding, a magnetic excitation system including a plurality of permanent magnet pole pieces arranged to cooperate electrodynamically with said core, a member of soft magnetic material arranged to support said pole pieces, a pole face of soft magnetic material carried by each of said pole pieces, and means including an axially extending slot through said pole faces and extending radially into said permanent magnet pole pieces for increasing the magnetic reluctance of said pole pieces to cross magnetizing flux.

12. A dynamo-electric machine having a core of magnetic material provided with a winding, a magnetic excitation system including a plurality of permanent magnet pole pieces arranged to cooperate electrodynamically with said core, a member of soft magnetic material arranged to support said pole pieces, a pole face of soft magnetic material carried by each of said pole pieces, and means including an axially extending slot through said pole face and through said pole pieces for minimizing the effect of cross magnetizing flux on said pole pieces produced by electric current in said winding.

13. A dynamo-electric machine having a core of magnetic material provided with a winding, a magnetic excitation system including a plurality of permanent magnet pole pieces arranged to cooperate electrodynamically with said core, a member of soft magnetic material arranged to support said pole pieces, a pole face of soft magnetic material carried by each of said pole pieces, and means for opposing variations in flux density in said pole pieces from cross magnetizing flux produced by electric current in said winding.

14. A dynamo-electric machine having a rotatable member provided with a winding and a stationary member having a plurality of permanent magnet pole pieces arranged to cooperate electrodynamically with said rotatable member, means for supporting said pole pieces, a pole face of soft magnetic material carried by each of said pole pieces, and means including a field exciting winding energized in accordance with the electric current through said rotatable member winding for producing a component of magnetomotive force in opposition to the cross magnetomotive force from electric current through said rotatable member winding.

15. A dynamo-electric machine having a rotatable member provided with a winding and a stationary member having a plurality of permanent magnet pole pieces arranged to cooperate electrodynamically with said rotatable member, a member of soft magnet material arranged to support said pole pieces, a pole face of soft magnetic material carried by each of said pole pieces, axially extending slots formed through each of said pole pieces, and means including a field exciting winding arranged on each of said pole pieces and in said slots for producing a component of magnetomotive force in accordance with the electric current in said rotatable member winding and in opposition to the cross magnetomotive force produced by the electric current in said rotatable member winding.

16. A dynamo-electric machine having a core of magnetic material provided with a winding, a magnetic excitation system including a plurality of permanent magnet pole pieces arranged to cooperate electrodynamically with said core, a member of soft magnetic material arranged to support said pole pieces, a pole face of soft magnetic material carried by each of said pole pieces, means including a field exciting winding energized in accordance with the electric current through said first-mentioned winding for producing a component of magnetomotive force in opposition to a cross component of magnetomotive force from electric current through said first-mentioned winding, and means for increasing the magnetic reluctance of said pole pieces to cross magnetizing flux by electric current in said first-mentioned winding.

WESLEY R. GOSS.
FRANK W. MERRILL.